United States Patent [19]

Imasu et al.

[11] 4,375,753

[45] Mar. 8, 1983

[54] AIR CONDITIONER

[75] Inventors: Kenichiro Imasu, Yasu; Akira Nakazawa; Masataka Yamane, both of Kusatsu; Kengo Takahashi, Katano, all of Japan.

[73] Assignee: Matsushita Electric Industrial Co., Ltd., Kadoma, Japan

[21] Appl. No.: 135,930

[22] Filed: Mar. 31, 1980

[30] Foreign Application Priority Data

| Apr. 2, 1979 [JP] | Japan | 54-039998 |
| Apr. 26, 1979 [JP] | Japan | 54-052098 |
| Sep. 29, 1979 [JP] | Japan | 54-125572 |
| Oct. 1, 1979 [JP] | Japan | 54-127134 |
| Oct. 1, 1979 [JP] | Japan | 54-127136 |

[51] Int. Cl.³ .................... F25B 13/00; G05D 15/00
[52] U.S. Cl. ..................... 62/160; 62/255; 236/68 B
[58] Field of Search ............. 62/160, 324, 66/225, 212; 236/68 B; 237/2 B

[56] References Cited

U.S. PATENT DOCUMENTS

| 2,534,455 | 12/1950 | Koontz . | |
| 3,324,674 | 6/1967 | Finnegan et al. | 62/204 |
| 3,464,227 | 9/1969 | Matthies | 62/225 |

FOREIGN PATENT DOCUMENTS

| 46-18696 | 5/1971 | Japan . | |
| 299716 | 4/1971 | U.S.S.R. | 62/225 |

Primary Examiner—William E. Wayner
Attorney, Agent, or Firm—Cushman, Darby & Cushman

[57] ABSTRACT

An air conditioner comprising:
 a compressor for compressing a refrigerant,
 an outdoor heat-exchanger,
 a pressure reducing device which controls flow rate of said refrigerant,
 an indoor heat-exchanger,
 refrigerant pipes connecting said compressor, said outdoor heat-exchanger, said valve and said indoor heat-exchanger in series,
characterized in that
 said pressure reducing device is a thermal electric type expansion valve comprising a bimetal piece held in a heat insulated manner and to move its moving part responding to an input electric power to a heater to heat said bimetal piece thereby to change flow rate of said valve and,
 said air conditioner further comprises an electric power output means which issues said input electric power, value of which changes responding to a refrigerant state difference between a first refrigerant state measured by a first measurement element disposed on either one of said indoor heat-exchanger or said outdoor heat-exchanger that is functioning as an evaporator and a second refrigerant state measured by a second measurement element disposed at a part between said either one of said indoor heat-exchanger or said outdoor heat-exchanger functioning as an evaporator and said compressor.

38 Claims, 14 Drawing Figures

AIR CONDITIONER

BACKGROUND OF THE INVENTION

1. Field of the Invention

The present invention relates to an improvement in air conditioner, particularly of a type that the capacity of its compressor is controlled responding with change of the load of cooling or heating.

2. Prior Art

FIG. 14 is a block diagram of an example of a conventional air conditioner of the type where capacity of the compressor is controlled responding with change of air condition load. The air conditioner comprises a refrigerant circuit connecting a compressor f, an indoor heat exchanger a, an expansion valve e and an evaporator g connected through tubes in that order to form a closed circuit of the refrigerant. In the conventional air conditioner, a pair of thermisters b and c are mounted on the input end part and the output end part of the indoor heat exchanger to measure the temperatures at the respective end parts, and the thermisters b and c are connected to the input terminals of a control circuit d, output terminal of which is connected to the expansion valve e to control it so as to change flow rate of the refrigerant thereby.

In such conventional air conditioner, when the flow resistance against the refrigerant flow of the indoor heat exchanger a is large, the temperature difference across the thermister b and c becomes large. Then, it is not easy to correctly detect the condition of the refrigerant at the output end part c, and hence, it is not easy to accurately control the condition of the refrigerant flowing into the compressor f. Furthermore, the conventional thermal-electric type valve has generally a slow response speed and hence hardly be used in air conditioners. Moreover, the conventional thermal-electric type valve can handle fluid in only one direction. Therefore, even if a thermal-electric type valve could be made to have a high response speed, it would still be necessary to use a pair of such valves connected parallely in opposite directions in case of all-season type air conditioner, where refrigerant flows in one direction for cooling the room and in the opposite direction thereto for heating the room.

SUMMARY OF THE INVENTION

The present invention can provide an efficient air conditioner which by employing an improved thermo-electric type expansion valve, enables a variable capacity control operation responding to a wide range of variation of load of cooling or heating.

Other objects of the invention will become clear by reading the following description of the embodiments of the present invention.

BRIEF DESCRIPTION OF THE DRAWINGS

FIG. 1–FIG. 4 show a first example of the present invention, wherein:

FIG. 1 is a refrigerant circuit diagram of the first example and,

FIG. 2 is a sectional view of a thermal-electric valve used in the first example apparatus of FIG. 1 and, FIG. 3 is a diagram schematically showing distribution of the liquid phase part and gas phase part of the refrigerant along the extended longitudinal positions of the evaporator of an air conditioner and FIG. 4 is an electric circuit diagram of the first example apparatus of FIG. 1.

FIG. 5–FIG. 6 show a second example of the present invention, wherein:

FIG. 5 is a refrigerant circuit diagram of the second example and,

FIG. 6 is an electric circuit diagram of the second example apparatus of FIG. 5.

FIG. 7–FIG. 9 show a third example of the present invention, wherein:

FIG. 7 is a refrigerant circuit diagram of the third example and,

FIG. 8 is a sectional side view of a thermal-electric valve used in the third example apparatus of FIG. 7 and, FIG. 9 is an electric circuit diagram of the third example apparatus of FIG. 7.

FIG. 11–FIG. 13 show a fifth example of the present invention, wherein:

FIG. 11 is a refrigerant circuit diagram of the fifth example and,

FIG. 12 is a sectional side view of a thermal-electric valve used in the fifth example apparatus of FIG. 11 and, FIG. 13 is an electric circuit diagram of the fifth example.

DESCRIPTION OF PREFERRED EMBODIMENT

The air conditioner of the present invention comprises:

a compressor for compressing a refrigerant, an outdoor heat exchanger, a pressure reducing device which controls flow rate of said refrigerant, an outdoor heat exchanger, refrigerant pipes connecting said compressor, said outdoor heat exchanger, said valve and said indoor heat exchanger in series, characterized in that said pressure reducing device is a thermal electric type expansion valve comprising a bimetal piece held in a heat insulated manner and to move its moving part responding to an input electric power to a heater to heat said bimetal piece thereby to change flow rate of said valve and, said air conditioner further comprises an electric power output means which issues said input electric power, value of which changes responding to a refrigerant state difference between a first refrigerant state measured by a first temperature measurement element disposed on either one of said indoor heat exchanger or said outdoor heat exchanger that is functioning as an evaporator and a second refrigerant state measured by a second measurement element disposed at a part between said either one of said indoor heat exchanger or said outdoor heat exchanger functioning as an evaporator and said compressor.

Preferred embodiments of the present invention are elucidated hereinafter referring to the accompanying figures, FIG. 1 to FIG. 13.

Figure 1:
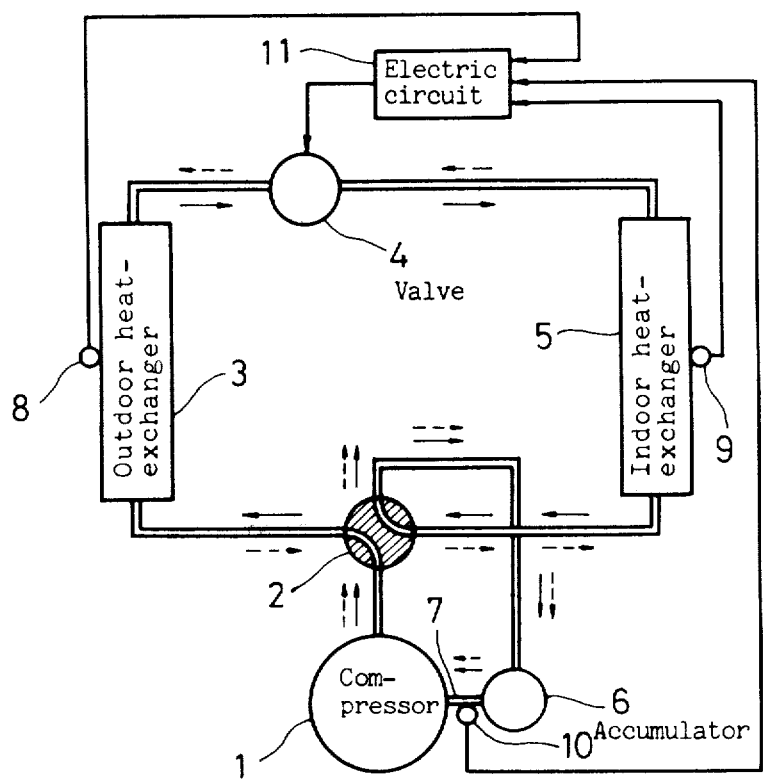

FIG. 1 to FIG. 4 show a first example, wherein FIG. 1 is a refrigerant circuit diagram. As shown in FIG. 1, a series connection of an outdoor heat exchanger 3, a thermal-electric expansion valve 4 as a pressure reducing device and an indoor heat exchanger 5 are connected in series by pipes and the series connected parts are further connected through a four-way valve 2 to a series connection of a compressor 1 and an accumulator 6 disposed in an upstream position thereto. A first thermister 8 as a first temperature measuring element is heat conductively disposed in the midway part with respect to an extended length of the outdoor heat exchanger 3 and a second thermistor 9 as a second temperature measuring element is heat conductively disposed in the midway part with respect to an extended length of the indoor heat exchanger 5. A third thermistor 10 as a third temperature measuring element is heat conductively disposed at the input part of the compressor 1. The electric output signals of these thermistors 8, 9 and 10 are connected to the input terminals of the electric circuit 11, whose output terminal is connected to the input terminals of the expansion valve 4.

Figure 2:
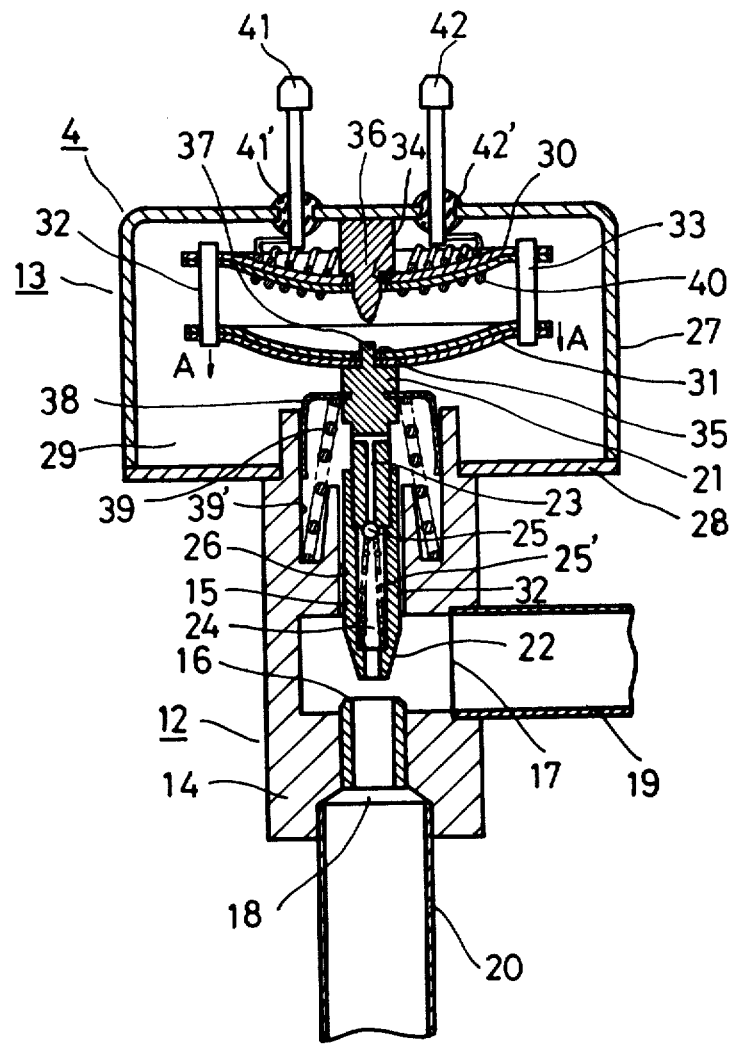

FIG. 2 is a sectional side view of the thermal electric expansion valve 4 of normal-open type. The valve comprises a valve part 12 which is a lower half part and a driving part 13 which is an upper half part. The valve part 12 comprises a block 14 having a valve rod 15 which is vertically movable therein in a through hole 26 and a valve seat 16 to receive said valve rod 15, and further comprises side port 17 and a bottom port 18 to which a first refrigerant pipe 19 and a second refrigerant pipe 20 are connected, respectively. The valve rod 15 comprises a lower part 22 whose lower end tip is tapered so as to be received in the valve seat 16 and an upper part 21 fixed to the lower part 22. A through-hole 23 of the upper part 21 and a through hole 24 of the lower part 22 are connecting each other and a check valve is formed by a ball 25 and a pressure spring 25' in the hole 24 in a manner to stop the refrigerant's flow into the driving part but allow it to flow back downwards. The driving part 13 has a closed space 29 defined by a casing 27 and a bottom sheet 28. The closed space 29 comprises a first bimetal disk 30 and a second bimetal disk 31 which are mechanically connected to each other with their peripheries held by several spacers 32, 33 of heat insulating material such as plastic rods. The first bimetal disk 30 is heat-insulatedly held by engagement of its center hole 34 with the end tip of a supporter 36 made of a heat insulating material mounted on the top part of the casing 27, and the second bimetal disk 31 is linked to the valve rod 15 by engagement of its center hole 35 with a protrusion 37 of the valve rod 15, which is pressed upwards by a pressure spring 39 held between a spring cover 38 and an annular recess 39'. The first bimetal disk 30 has the peripheral part which is bent upwards in normal temperature but bends down when heated.

The first bimetal disk 30 comprises an electric heater wire 40 wound on its surface and both ends of the electric heater wire 40 are connected to the terminals 41 and 42 which are provided air-tightly by means of, for example glass insulaters 41' and 42'. FIG. 2 shows the states when the heater wire 40 is not energized and therefore the valve rod 15 is apart from the valve seat 16 thereby opening the valve. When energized by the electric power fed from the terminals 41 and 42, the heater wire 40 heats the first bimetal disk 30, so that the first bimetal disk becomes bent to lower the peripheral parts downwards as shown by the arrows A, A, thereby to lower the valve rod 15 downwards, overcoming the force of the spring 39. Accordingly, the gap between the lower end tip of the valve rod 15 and the valve seat 16 is narrowed and the flow rate through the valve is lowered. When the electric power fed to the heater wire 40 is larger, the flow rate of the valve is lower, and vice versa. The second bimetal disk 31 serves to compensate influence by the condition of the load and is bent by the temperature of the ambient air and refrigerant which flows into the closed space 29 through a narrow gap between the through hole 26 and the valve rod 15.

The abovementioned thermal electric expansion valve 4 can be used for both directions of fluid flow, that is, not only for a direction of from the lower pipe 20 to the side pipe 19, but also for the opposite direction of from the side pipe 19 to the lower pipe 20. When the fluid flow is of the above-mentioned opposite direction, that is from the pipe 19 to the pipe 20 because the pressure in the pipe 19 is higher than that in the pipe 20, a part of the refrigerant flows upwards into the closed space 29 through the gap around the valve rod 15 thereby raising the pressure in the closed space 29. Such refrigerant of raised pressure in the closed space 29 flows out thereof via the through-hole 23, check valve 25 and the through hole 24. Therefore, such opposite direction fluid from the pipe 19 to the pipe 20 does not harm the proper function of the valve at all. On the contrary, when the pressure is higher in the pipe 20 than in the pipe 19, the check valve 25 is closed, and therefore the refrigerant hardly flows into the closed space 29.

Figure 4:
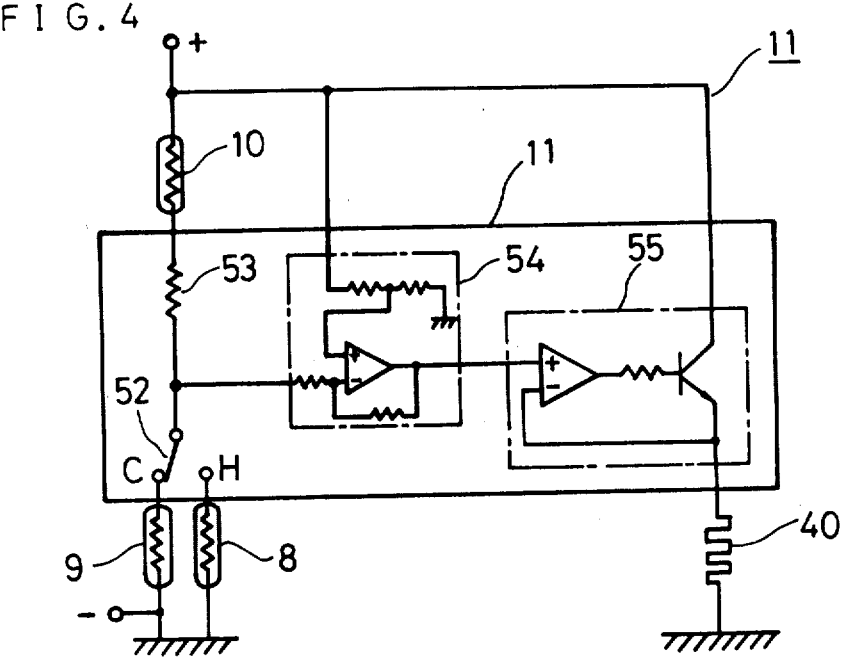

FIG. 4 is one example of electric circuit diagram of the apparatus of FIG. 1. The circuit comprises the thermistors 8 and 9 each one end of which is connected to a negative terminal − of a power source. The other ends of the thermistors 8 and 9 are connected to respective contacts H and C of a change over switch 52 which switches the operation for heating room and cooling room by turning to the respective contacts H and C. A series connection of the thermistor 10 and a resistor 53 for setting level of superheating is connected between a positive terminal + of the power source and the moving contact of the change-over switch 52, and the latter is connected also to an input terminal of a proportional amplifier 54. The output terminal of the proportional amplifier 54 is connected to an input terminal of an output amplifier 55 comprising a buffer amplifier in its input stage. The heater wire 40 is connected to the output terminal of said output amplifier 55, so that the heater wire 40 is energized by the output amplifier 55 produces an output proportional to voltage changes of the thermister circuit.

In the cooling operation, when a cooling load (hereinafter implying a cooling load produced by a heat-exchange in the indoor heat-exchanger) increases and hence the temperature difference between the thermistors 9 and 10 becomes higher than a predetermined value, then the resistance of the thermistor 10 decreases and the input voltage of the proportional amplifier 54 increases. Then the current of the output amplifier 55 decreases, so that the flow rate of the expansion valve 4 is increased, to increase the capacity of the air conditioner thereby restoring the temperature of the thermistor 10 to a predetermined value. On the contrary, when the cooling load decreases and hence the temperature difference between the thermistors 9 and 10 becomes lower, the flow rate of the expansion valve 4 is decreased, to decrease the capacity of the air conditioner thereby also restoring the temperature difference between the thermistors 9 and 10 to the predetermined value.

In the heating operation, when the heating load (hereinafter implying a heating load produced by a heat-exchange in the indoor heat-exchanger) increases, the temperature difference between the thermistors 9 and 10 becomes higher than a predetermined value, then the resistance of the thermistor 10 decreases and the input voltage of the proportional amplifier increases. Then the current of the output amplifier 55 decreases, so that the flow rate of the expansion valve 4 is increased to increase the capacity of the air conditioner thereby restoring the temperature difference between the thermistors 9 and 10 to a predetermined value. On the contrary, when the heating load decreases and hence the temperature of the thermistor 10 becomes lower, the flow rate of the expansion valve 4 is decreased, to decrease the capacity of the air conditioner thereby also restoring the temperature of the thermister to the predetermined value.

The operation of the abovementioned apparatus is as follows:

When the switch 52 is turned to the side of contact C for selection of the cooling operation and the compressor is driven, the refrigerant flows as shown by the solid line arrows, and the high pressure and high temperature refrigerant flows through the four-way valve 2, outdoor heat exchanger 3, the thermal electric expansion valve 4, the indoor heat exchanger 5, the four-way valve 2 and the accumulator 6 and returns to the compressor 1. In this flow, the high temperature refrigerant is cooled by the outdoor heat exchanger 3, and pressure of the refrigerant is reduced by the expansion valve 4 thereby to lower the temperature of the refrigerant. Then during the passing of the indoor heat exchanger 5, the temperature of the refrigerant becomes high.

When the cooling load becomes larger or smaller and therefore the temperatures at the thermistors 9 and 10 changes, the electric circuit 11 measures the resultant difference between a predetermined resistance value and a difference value between the electric resistance values of the thermistors 9 and 10. And accordingly, the circuit 11 changes its output current to the heater wire 40 responding to the abovementioned resultant difference.

When the measured difference between the resistance of the thermistors 9 and 10 is smaller than a predetermined value, the circuit works to increase the output power fed to the heater wire 40 of the valve 4, thereby to bring the valve rod 15 down and hence decreases flow rate of the valve 4. Therefore, the temperature at the input end of the compressor 1 is raised, and thereby, the difference between the resistances of the thermistors 9 and 10 becomes larger.

On the contrary, when the measured difference between the resistances of the thermistors 9 and 10 is larger than the predetermined value, the circuit works to decrease the output power fed to the heater wire 40 of the valve 4, thereby to bring the valve rod 15 up and hence increases flow rate of the valve 4. Therefore, the temperature at the input end of the compressor 1 is lowered, and thereby, the difference between the resistances of the thermistors 9 and 10 becomes smaller. By means of such feed-back operation, the resistance difference between two thermistors 9 and 10, that is, the temperature difference between two parts where the thermistors 9 and 10 are attached is retained constant irrespective of variation of the cooling load, by suitably controlling condition of the refrigerant flowing into the compressor 1. Moreover, by such controlling, the temperature of the compressor 1 can be controlled by changing the flow rate of the expansion valve 4, so as not to raise it excessively high thereby to protect it.

In case of the heating operation, the automatic control operation for retaining the temperature difference for variation of the heating load is made in a similar manner by changing the flow rate of the valve.

Figure 3:
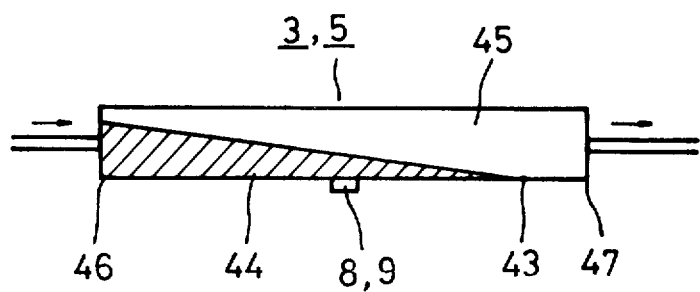

FIG. 3 schematically shows positionings of the thermistors 8 or 9 with respect to hypothetically extended geometry of the heat-exchanger 3 or 5. In FIG. 3, hatched area 44 represent the amount of liquid phase part of the refrigerant and non-hatched area 45 represent amount of gas phase part of the refrigerant, both along the longitudinal position of the extended geometry of the heat-exchanger 3 or 5 where the refrigerant flows from the input end 46 to the exit 47 therethrough, gradually making evaporation during heat exchanging. In case of the cooling operation, the refrigerant coming from the expansion valve 4 to the heat exchanger 5 consists of a large proportion of liquid phase part and a small proportion of gas phase part, and such mixed phase refrigerant flows in from the input end 46 into the heat exchanger 5. As the mixed phase refrigerant travels through the heat-exchanger 5, the liquid phase portion further eavaporates into gas phase, and therefore, the proportion of the gas phase gradually increases as the refrigerant travels to the exit 47. In an ideal state, the refrigerant entirely becomes gas phase at a position 43, which is before but near the exit 47. In such case the evaporated refrigerant is brought through the four-way valve 2 and accumulator 6 which remove liquid phase component of the refrigerant, into the compressor 1. The thermistor 9 measures the saturation temperature of the refrigerant at the position where the thermistor 9 is fixed. If flow resistance between the position of the thermistor 9 and the input part of the compressor where the thermistor 10 is fixed is not large, the measured temperature by the thermistor 10 becomes almost the same as that measured by the thermistor 9. When these temperatures differ much from each, it means that the flow resistance between the position of the thermistor 9 on the heat exchanger 5 and the position of the input end of the compressor 1 is undesirably high due to, for example, undesirably high amount of liquid phase refrigerant in this section of the refrigerant circuit, wherein the refrigerant should be almost in gas phase in order not to cause a liquid compression, which is harmful for the compressor. In such case, the capacity of the compressor 1 and the flow rate of the expansion valve 4 should be reduced thereby to eliminate the undesirable liquid compression.

The position to fix the thermistor 9 on the heat-exchanger 5 has an important effect for attaining good controlling. As is well known, when the cooling or heating load changes, the state of the refrigerant in the circuit changes. Accordingly, in the heat-exchanger 5 schematically shown in FIG. 3, the boundary position 43 where all the refrigerant becomes in gas state moves depending on the load. If the thermistor 9 is fixed on a position near the exit 7 and when the boundary position 43 moves to the upstream side due to, for example, a heavier cooling load, then the thermistor measures super-heated gas phase refrigerant which is high than the saturation temperature of the refrigerant; on the other hand when the boundary position moves to the exit 47 due to, for example, a lighter cooling load, then the measured temperature is the saturation temperature of the refrigerant. That is to say, if the thermistor 9 is fixed on a position at or near the exit, the measured temperature does not indicate the uniform meaning. The same apply to the case of the outdoor heat-exchanger. Accordingly, the position to fix the thermistor 8 or 9 should be near the central part of the extended length of the heat exchanger. In such central part, even though a considerable change of the load takes place, the phase of the refrigerant is always mixed phase of gas and liquid, thereby always showing saturation temperature of the refrigerant. Therefore, by utilizing the thermistors 9 and 10 in case of the cooling operation of the thermistors 8 and 10 in case of the heating operation, the state of the refrigerant flowing into the compressor 1 is always appropriately detected. Therefore, by utilizing such correctly detected information and the variable flow-rate expansion-valve, a stable and safe operation of the air conditioner is obtainable for a wide range of change of the load.

In case of the heating operation, the four-way valve 2 is switched in a manner that, as shown by the dot line arrows, the compressed refrigerant is sent out to the indoor heat-exchanger 5, and the refrigerant passes through the expansion valve 4, the outdoor heat-exchanger 3, the four-way valve 2 and the accumulator 6 and returns to the compressor 1. The compressed high temperature refrigerant gives heat to the indoor heat-exchanger 5, then partly evaporated in the expansion valve 4 thereby lowering its temperature to a very low temperature, and then is heated, for example, by air in the outdoor heat-exchanger 3 thereby changing into gas state, and is compressed by the compressor 1. Therefore, the condition in the outdoor heat-exchanger 3 in the heating operation is similar to that in the indoor heat-exchanger 5 in the cooling operation.

The abovementioned first example employs the normal-open type expansion valve 4, which at deenergization of its heat wire 40 pulls up valve rod 15 from the valve seat 16, thereby making the valve fully open, and as the current in the heater wire 40 increases brings down the valve rod 15 and finally to close the valve by making its lower end tip contact the valve seat 16. Use of such normal-open type expansion valve 4 gives the advantage of quick starting. That is because the valve 4 is substantially fully open from the beginning of the start of the compressor 1, flow rate of the refrigerant in the heat-exchanger 8 or 9 is large at the starting. After reaching a steady operation state, a predetermined current responding to the signals from the thermistor 9 and 10 is fed to the heater wire 40 as described above. Besides, if by some reason the electric controlling circuit becomes defective and fails to feed current to the heater wire 40, and compressor 1 is started without noticing such failure, then the compressor 1 is not damaged because the valve is fully open. Furthermore, after each switching off of the apparatus, the pressures of the refrigerant at various parts of the apparatus becomes quickly made even; and therefore a restarting within a short time is possible.

Furthermore, the expansion valve 4 of this reference can control the flow of the refrigerant of bilateral directions, and therefore, with providing only a single thermal electric valve, a desirable refrigerant flow control of both directions is obtainable, thus enabling economical construction of the air conditioner of bilateral use of cooling and heating.

Figure 5:
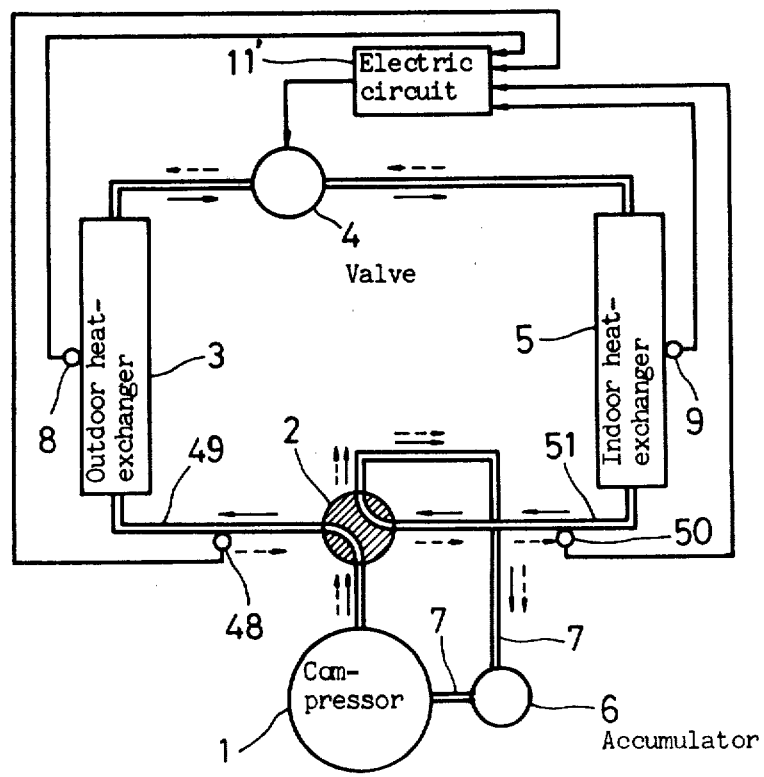
Figure 6:
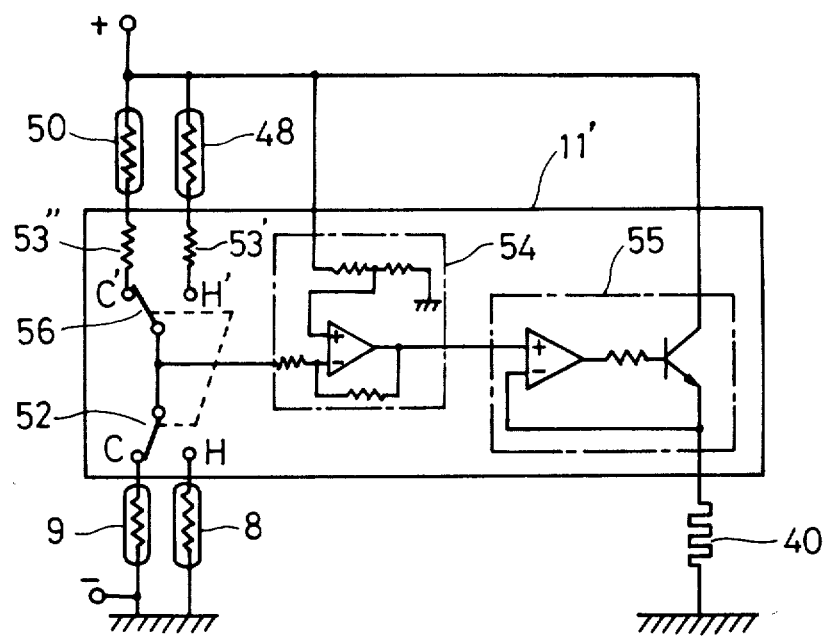

A second example of the present invention is elucidated referring to the accompanying figures, FIG. 2, FIG. 5 and FIG. 6, wherein FIG. 5 is a refrigerant circuit diagram. As shown in FIG. 5, a series connection of an outdoor heat exchanger 3, a thermal-electric expansion valve 4 as a pressure reducing device and an indoor heat exchanger 5 are connected in series by pipes and the series connected parts are further connected through a four-way valve 2 to a series connection of a compressor 1 and an accumulator 6 disposed in an upstream position thereto. A first thermistor 8 as a first temperature measuring element is heat conductively disposed in the midway part with respect to an extended length of the outdoor heat exchanger 3 and a second thermistor 9 as a second temperature measuring element is heat conductively disposed in the midway part with respect to an extended length of the indoor heat-exchanger 5. A third thermistor 48 as a third temperature measuring element is heat-conductively disposed on the refrigerant pipe 49 between the outdoor heat-exchanger 3 and the four-way valve 2. A fourth thermistor 50 is heat-conductively disposed on the refrigerant pipe 51 between the indoor heat-exchanger 5 and the four-way valve 2. The electric output signals of these thermistors 8, 9, 48 and 51 are connected to the input terminals of the electric circuit 11', whose output terminal is connected to the input terminals of the expansion valve 4.

The normal open type thermal electric expansion valve used in this second embodiment is the same one as shown and elucidated referring to FIG. 2, and therefore, the same elucidation therefor applies.

FIG. 6 is one example of electric circuit diagram of the apparatus of FIG. 5. The circuit comprises the thermistors 9 and 8 each one end of which is connected to a negative terminal — of a power source. The other ends of the thermistors 8 and 9 are connected to respective contacts H and C of a first change over switch 52 which switches the operation for heating room and cooling room by connection to the respective contacts H and C. A series connection of the thermistor 48 and a resistor 53' for setting level of superheating is connected between a positive terminal + of the power source and a fixed contact H' of a second change over switch 56, and another series connection of the thermistor 50 and a resistor 53" for setting superheating level is connected between the positive terminal + and a fixed contact C of the change-over switch 56. And both of the change-over switches 52 and 56 are mechanically linked to turn simultaneously to C and C' side and to H and H' side. Both moving contacts of the switches are connected to an input terminal of a proportional amplifier 54. The output terminal of the proportional amplifier 54 is connected to an input terminal of an output amplifier 55 comprising a buffer amplifier in its input stage. The heater wire 40 is connected to the output terminal of said output amplifier 55, so that the heater wire 40 energized by the output amplifier produces an output proportional to voltage changes of the thermistor circuit.

In the cooling operation, when a cooling load increases and hence the temperature difference between the thermistors 9 and 50 becomes higher than a predetermined value, then the resistance of the thermistor 50 decreases and the input voltage of the proportional amplifier 54 increases. Then the current of the output amplifier 55 decreases, so that the flow rate of the expansion valve 4 is increased to increase the capacity of the air conditioner thereby restoring the temperature difference between the thermistors 9 and 50 to a predetermined value. On the contrary, when the cooling load decreases and hence the temperature of the thermistor 50 becomes lower, the flow rate of the expansion valve 4 is decreased, to decrease the capacity of the air conditioner thereby also restoring the temperature of the thermistor 50 to the predetermined value.

In the heating operation, when the heating load increases, the temperature difference between the thermistors 9 and 48 becomes higher than a predetermined value, then the resistance of the thermistor 48 decreases and the input voltage of the proportional amplifier increases. Then the current of the output amplifier 55 decreases, so that the flow rate of the expansion valve 4 is increased to increase the capacity of the air conditioner thereby restoring the temperature difference between the thermistors 9 and 48 to a predetermined value. On the contrary, when the heating load decreases and hence the temperature of the thermistor 48 becomes lower, the flow rate of the expansion valve 4 is decreased, to decrease the capacity of the air conditioner thereby also restoring the temperature of the thermistor to the predetermined value.

The operation of the abovementioned apparatus is almost similar to the apparatus shown by FIG. 1 to FIG. 4, except that the temperature of the input end of the compressor 1 is measured by the third thermistor and the fourth thermistor respectively for heating and for cooling. This circuit is easier in selecting the level of superheating, since the circuit has individual series resistors 53' and 53" for setting the superheating levels respectively for heating operation and cooling operation.

The abovementioned second example employs the normal-open type expansion valve 4, which at deenergization of its heat wire 40 pulls up the value rod 15 from the valve seat 16, thereby making the valve fully open, and as the current in the heater wire 40 increases brings down the valve rod 15 and finally to close the valve by making its lower end tip contact the valve seat 16. Use of the normal-open type expansion valve 4 gives the several advantages elucidated in the first example.

Figure 7:
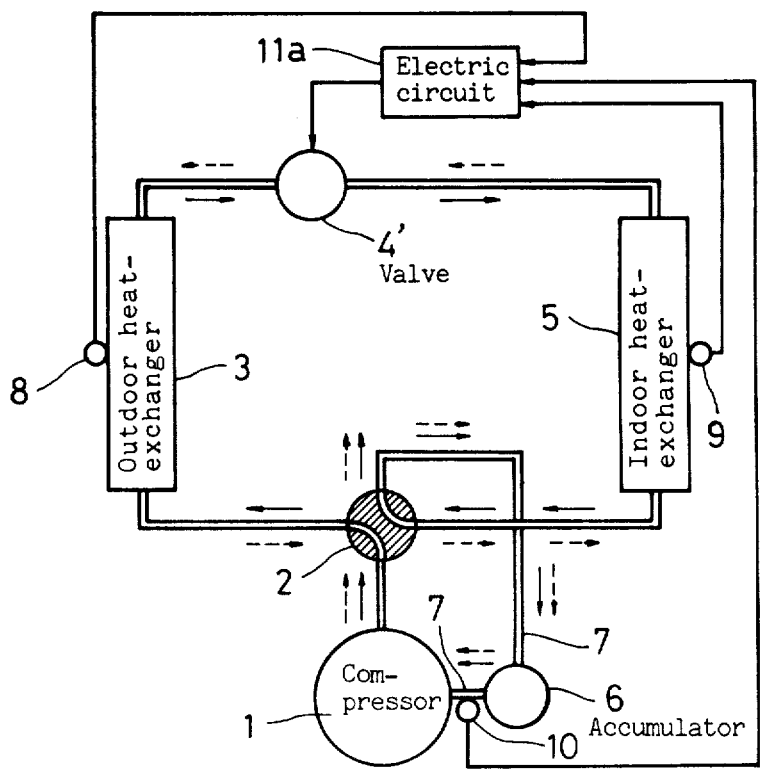
Figure 8:
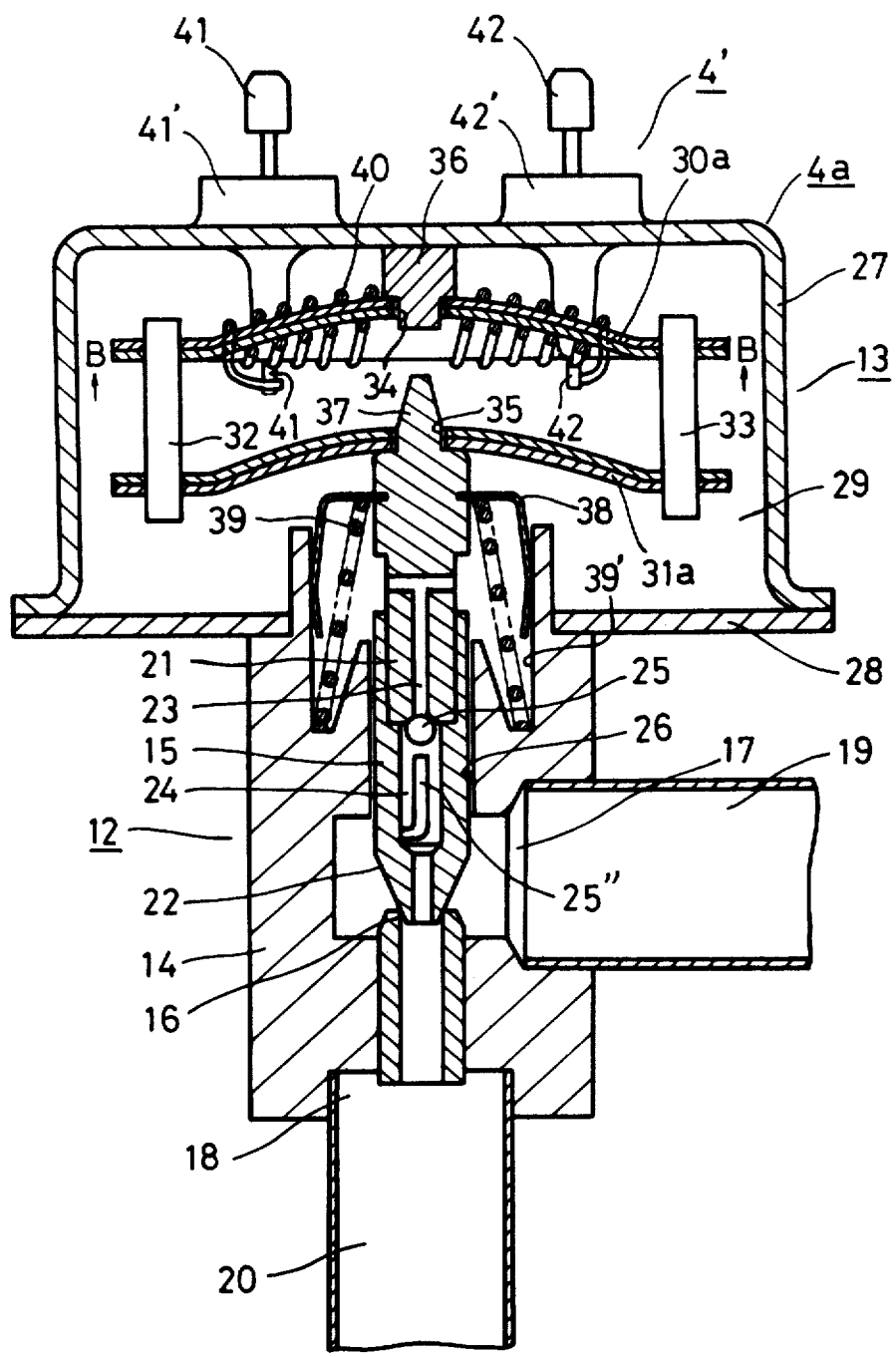

A third example of the present invention is elucidated referring to FIG. 7 to FIG. 10, wherein FIG. 7 is a refrigerant circuit diagram. The contents of the refrigerant circuit diagram is similar to that of FIG. 1 of the first embodiment, except that the electric circuit 11a is different from that of 11 of FIG. 1. However, a thermal-electric expansion valve 4' in FIG. 7 has a special construction as shown in FIG. 8, which is different from that of the valve 4 of FIG. 2 of the first example. That is to say, the thermal electric expansion valve 4' of FIG. 8 of this second embodiment is a normal-close type valve apart from the normal-open type expansion valve of the first example.

FIG. 8 is a sectional side view of the thermal electric expansion valve 4' of the normal close type. The valve comprises a valve part 12 which is a lower half part and a driving part 13 which is an upper half part. The valve part comprises a block 14 having a valve rod 15 which is vertically movable therein in a through hole 26 and a valve seat 16 to receive said valve rod 15, and further comprises side port 17 and a bottom port 18 to which a first refrigerant pipe 19 and a second refrigerant pipe 20 are connected, respectively. The valve rod 15 comprises a lower part 22 whose lower end tip is tapered so as to be received in the valve seat 16 and an upper part 21 fixed to the lower part 22. A through hole 23 of the upper part 21 and a through hole 24 of the lower part 22 are connecting each other and a check valve is formed by a ball 25 and a ball holder rod 25" in the hole 24 in a manner to stop the refrigerant's flow into the driving part but allow it to flow back downwards. The driving part 13 has a closed space 29 defined by a casing 27 and a bottom sheet. The closed space 29 comprises a first bimetal disk 30a and a second bimetal disk 31a which are mechanically connected to each other with their peripheries held by several spacers 32, 33 of heat insulating material such as plastic rods. The first bimetal disk 30a is heat-insulatedly held by engagement of its center hole 34' with the end tip of a supporter 36 made of a heat insulating material mounted on the top part of the casing 27, and the second bimetal disk 31a is linked to the valve rod 15 by engagement of its center hole 35 with a protrusion 37 of the valve rod 15, which is pressed upwards by a pressure spring 39 held between a spring cover 38 and an annular recess 39'. The first bimetal disk 30a has the peripheral part which is bent downwards in normal temperature but bends upwards when heated.

The first bimetal disk 30a comprises electric heater wire 40 wound on its surface and both ends of the electric heater wire 40 are connected to the terminal 41 and 42 which are provided air-tightly by means of, for example glass insulators 41' and 42'. FIG. 8 shows the states when the heater heater wire 40 is not energized and therefore the periphery of the first bimetal disk 30a is bent downwards and hence the valve rod 15 contacts the valve seat thereby closing the valve. When energized by the electric power fed from the terminals 41 and 42, the heater wire 40 heats the first bimetal disk 30a, so that the first bimetal disk 30a becomes bent up to lift the peripheral parts upwards as shown by the arrows B, B, thereby allows the valve rod 15 to rise upwards, by means of the force of the spring 39. Accordingly, a gap is formed between the lower end tip of the valve rod 15 and the valve seat 16 and the flow rate through the valve is raised. When the electric power fed to the heater wire 40 is larger, the flow rate of the valve is higher, and vice versa. The second bimetal disk 31a serves to compensate influence by the condition of the load and is bent by the temperature of the ambient air and refrigerant which flows into the closed space 29 through a narrow gap between the through hole 26 and the valve rod 15.

The abovementioned thermal electric expansion valve 4' can be used for both directions of fluid, that is not only for a direction of from the lower pipe 20 to the side pipe 19, but also for the opposite direction of from the side pipe 19 to the lower pipe 20. When the fluid flow is of the above-mentioned opposite direction, that is from the pipe 19 to the pipe 20 because the pressure in the pipe 19 is higher than that in the pipe 20, a part of the refrigerant flows upwards into the closed space 29 through the gap around the valve rod 15 thereby raising the pressure in the closed space 29. Such refrigerant of raised pressure in the closed space 29 flows out thereof via the through-hole 23, check valve 25 and the through hole 24. Therefore, such opposite direction fluid from the pipe 19 to the pipe 20 does not harm the proper function of the valve at all. On the contrary, when the pressure is higher in the pipe 20 than in the pipe 19, the check valve 25 is closed, and therefore the refrigerant hardly flows into the closed space 29.

Figure 9:
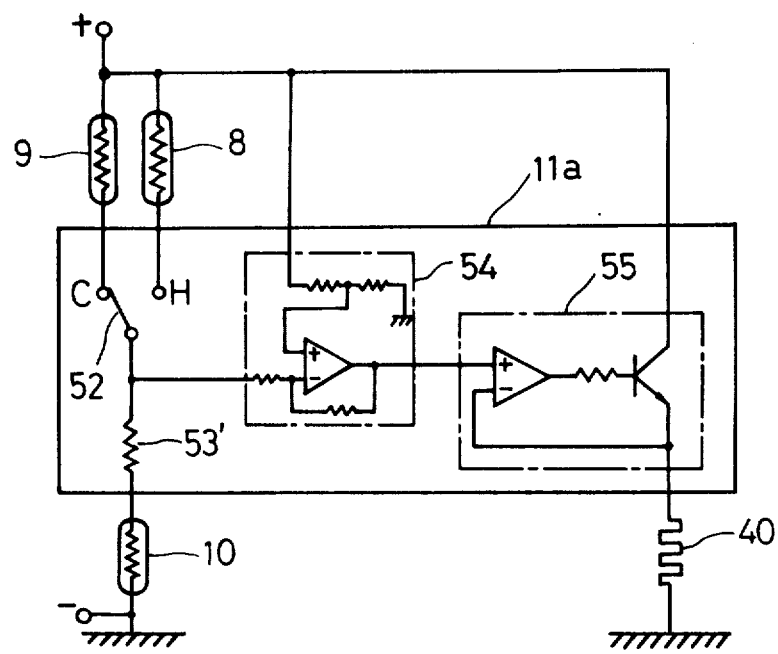

FIG. 9 is one example of electric circuit diagram of the third embodiment apparatus of FIG. 7. The circuit comprises the thermistors 8 and 9 each one end of which is connected to a positive terminal + of a power source. The other ends of the thermistors 8 and 9 are connected to respective contacts H and C of a change-over switch 52 which switches the operation for heating room and cooling room by turning to the respective contacts H and C. A series connection of the thermistor 10 and a resistor 531 for setting level of superheating is connected between a negative terminal − of the power source and the moving contact of the change-over switch 52, and the latter is connected also to an input terminal of a proportional amplifier 54. The output terminal of the proportional amplifier 54 is connected to an input terminal of an output amplifier 55 comprising a buffer amplifier in its input stage. The heater wire 40 is connected to the output terminal of said output amplifier 55, so that the heater wire 40 is energized by the output amplifier 55 produces an output proportional to voltage changes of the thermistor circuit.

In the cooling operation, when a cooling load increases and hence the temperature difference between the thermistors 9 and 10 become higher than a predetermined value, then the resistance of the thermistor 10 decreases and the input voltage of the proportional amplifier decreases. Then the current of the output amplifier 55 increases, so that the periphery of the bimetal goes up, thereby lifting the valve rod 15, and therefore the flow rate of the expansion valve 4' is increased, to increase the capacity of the air conditioner thereby restoring the temperature difference between the thermistors 9 and 10 to a predetermined value. On the contrary, when the cooling load decreases and hence the temperature of the thermistor becomes lower, the flow rate of the expansion valve 4' is decreased, to decrease the capacity of the air conditioner thereby also restoring the temperature difference between the thermistors 9 and 10 to the predetermined value.

In the heating operation, when the heating load increases, the temperature difference between the thermistors 9 and 10 becomes higher than a predetermined value, then the resistance of the thermistor 10 decreases and the input voltage of the proportional amplifier decreases. Then the current of the output amplifier 55 increases, so that the flow rate of the expansion valve 4' is increased to increase the capacity of the air conditioner thereby restoring the temperature difference between the thermistors 9 and 10 to a predetermined value. On the contrary, when the heating load decreases and hence the temperature of the thermistor 10 becomes lower, the flow rate of the expansion valve 4' is decreased, to increase the capacity of the air conditioner thereby also restoring the temperature difference between the thermistors 9 and 10 to the predetermined value.

As has been elucidated above, though the type of the thermal electric expansion valve is of the opposite type with respect to its open and close motion for the input electric power, the automatic operation of the valve with respect to the heating load or cooling load is obtainable, thereby assuring appropriate operation for the compressor.

Figure 10:
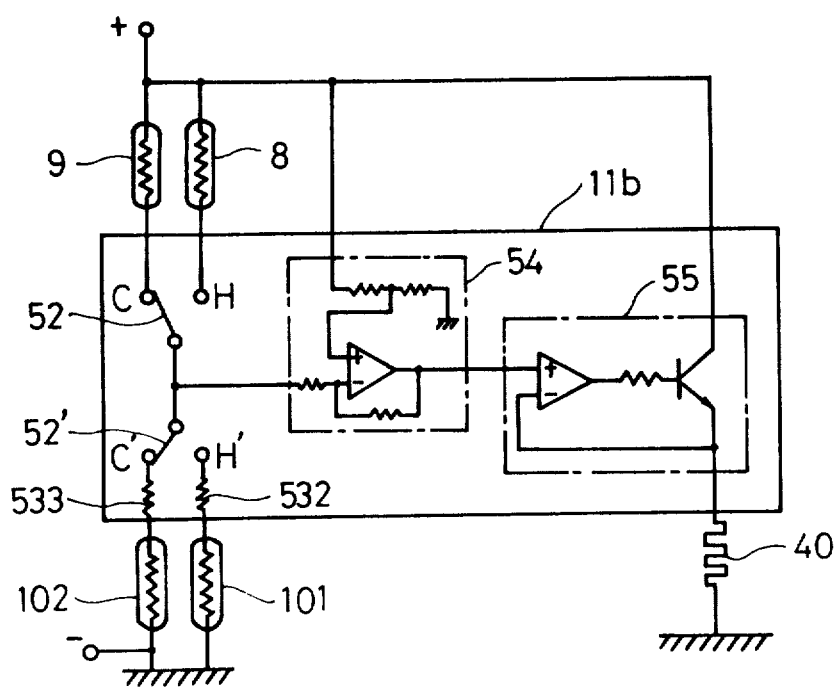
FIG. 10 is an electric circuit diagram of a fourth example.

FIG. 10 is an electric circuit diagram of a fourth example of the present invention utilizing the normal-close type thermal electric expansion valve elucidated referring to FIG. 8. The refrigerant circuit of this fourth example is almost the same as FIG. 5 except that the normal-open type thermal electric expansion valve 4 is replaced by the normal-close type thermal electric expansion valve 4' of FIG. 8. The electric circuit 11b of FIG. 10 comprises the thermistors 9 and 8 each one end of which is connected to a positive terminal + of a power source. The other ends of the thermistors 8 and 9 are connected to respective contacts H and C of a change over switch 52 which switches the operation for heating room and cooling room by connection to the respective contacts H and C. A series connection of the thermistor 101 and a resistor 532 for setting level of superheating is connected between a negative terminal − of the power source and a fixed contact H' of a second change-over switch 52', and another series connection of the thermistor 102 and a resistor 533 for setting superheating level is connected between the negative terminal − and a fixed contact C' of the change-over switch 52'. And both of the change-over switches 52 and 52' are mechanically linked to turn simultaneously to C and C' side and to H and H' side. Both moving contacts of the switches are connected to an input terminal of a proportional amplifier 54. The output terminal of the proportional amplifier 54 is connected to an input terminal of an output amplifier 55 comprising a buffer amplifier in its input stage. The heater wire 40 of the expansion valve 4' of FIG. 8 is connected to the output terminal of said output amplifier 55, so that the heater wire 40 energized by the output amplifier produces an output proportional to voltage changes of the thermistor circuit.

In the cooling operation, when a cooling load increases and hence the temperature difference between the thermistors 9 and 102 becomes higher than a predetermined value, then the resistance of the thermistor 102 decreases and the input voltage of the proportional amplifier decreases. Then the current of the output amplifier 55 increases, so that the flow rate of the expansion valve 4' is increased to increase the capacity of the air conditioner thereby restoring the temperature difference between the thermistors 9 and 102 to a predetermined value. On the contrary, when the cooling load decreases and hence the temperature of the thermistor becomes lower, the flow rate of the expansion valve 4' is decreased, to decrease the capacity of the air conditioner thereby also restoring the temperature difference between the thermistors 9 and 102 to the predetermined value.

In the heating operation, when the heating load increases, the temperature difference between the thermistors 8 and 101 becomes higher than a predetermined value, then the resistance of the thermistor 101 decreases and the input voltage of the proportional amplifier decreases. Then the current of the output amplifier 55 increases, so that the flow rate of the expansion valve 4' is increased to increase the capacity of the air conditioner thereby restoring the temperature difference between the thermistors 8 and 101 to a predetermined value. On the contrary, when the heating load decreases and hence the temperature of the thermistor 101 becomes lower, the flow rate of the expansion valve 4' is decreased, to increase the capacity of the air conditioner thereby also restoring the temperature difference between the thermistors 8 and 101 to the predetermined value.

Figure 11:
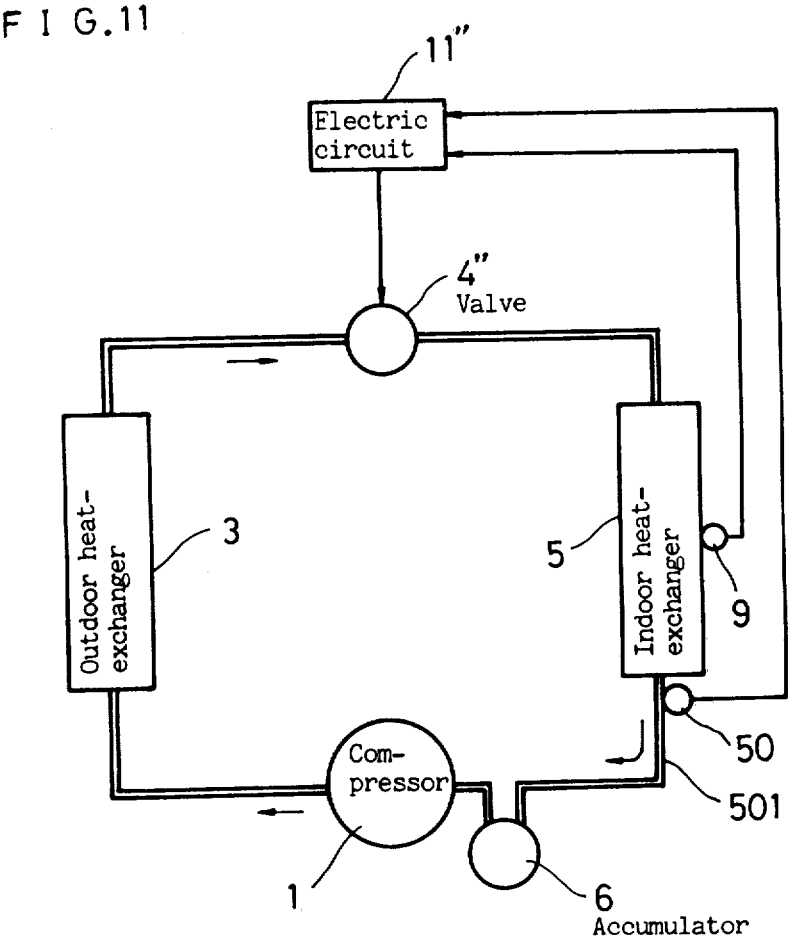
Figure 12:
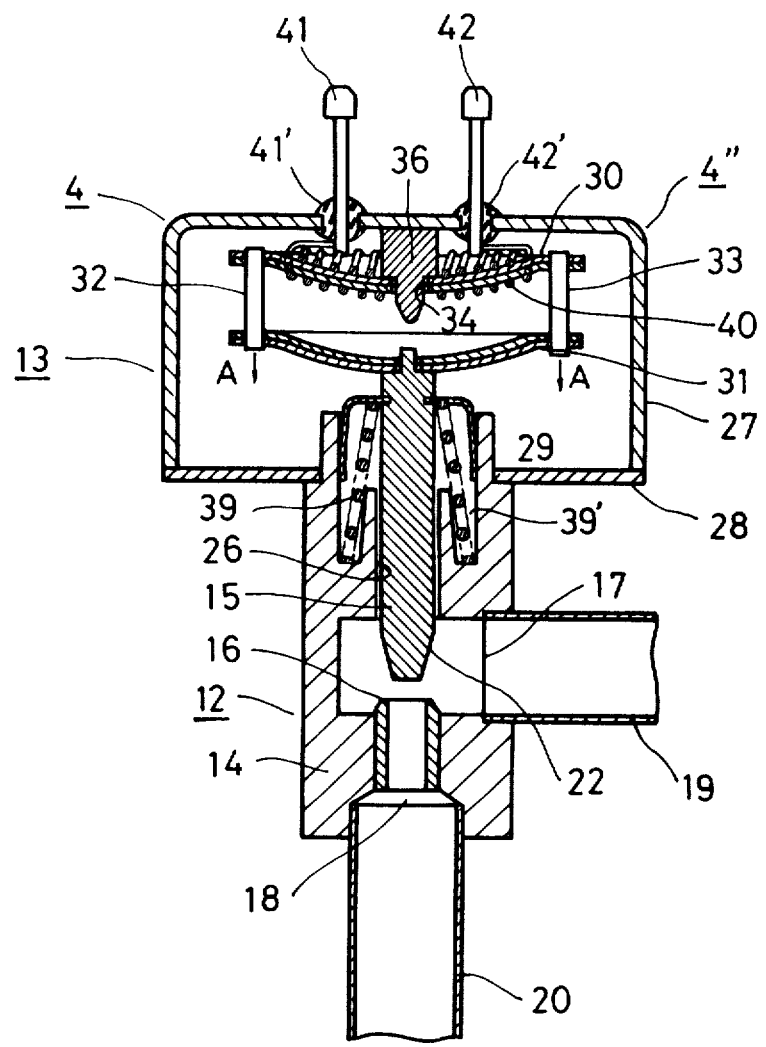
Figure 13:
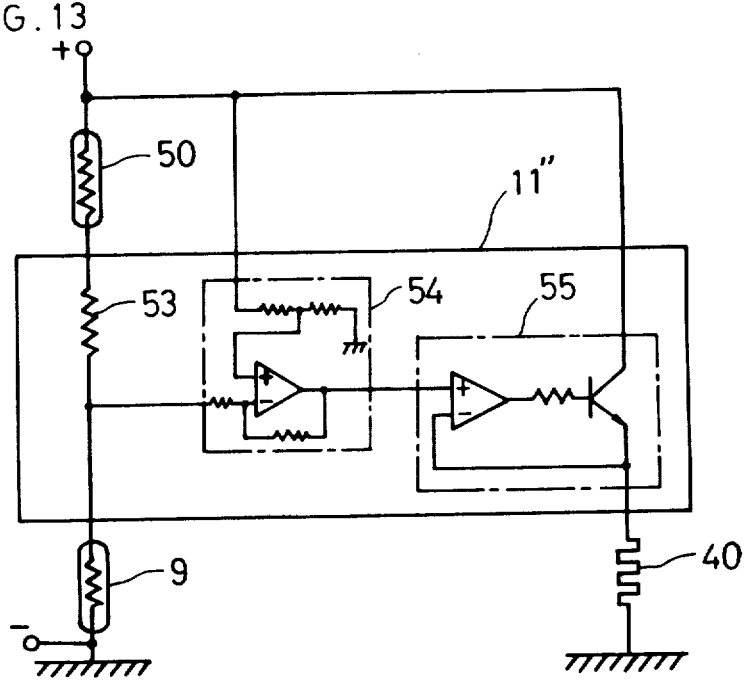
Figure 14:
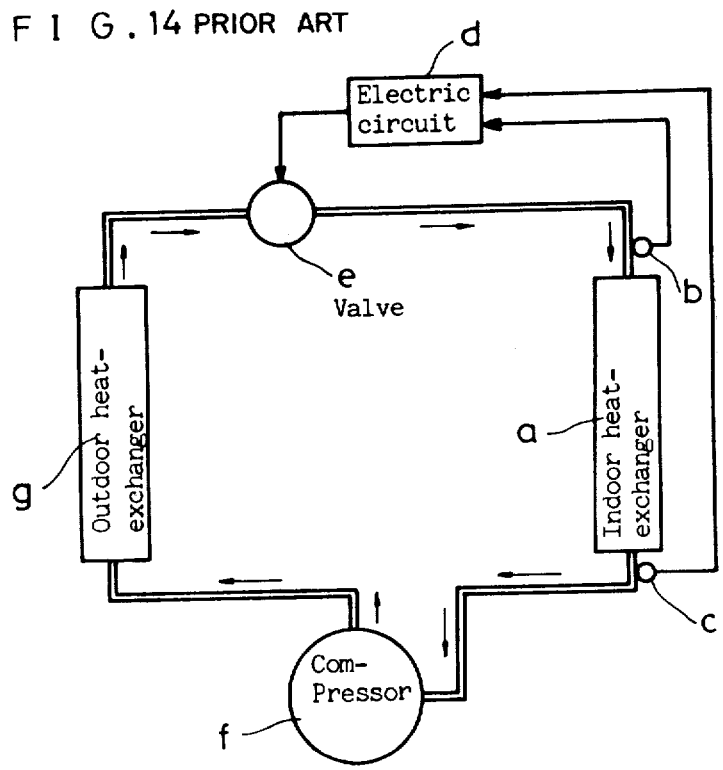
FIG. 14 is a refrigerant circuit diagram of an example of the conventional air conditioner.

A fifth example of the present invention is elucidated referring to FIG. 11 to FIG. 13, wherein FIG. 11 is a refrigerant circuit diagram of the fifth example, FIG. 12 is a sectional side view of a thermal electric expansion valve 4" of FIG. 11, and FIG. 13 is an electric circuit diagram of the apparatus of this fifth example.

As shown in FIG. 11, a series connection of an outdoor heat-exchanger 3, a thermal-electric expansion valve 4" as a pressure reducing device and an indoor heat-exchanger 5 are connected in series by pipes and the series connected parts are further connected to a series connection of a compressor 1 and an accumulator 6. A thermistor 9 as a temperature measuring element is heat conductively disposed in the midway part with respect to an extended length of the indoor heat-exchanger 5. Another thermistor 50 as a third temperature measuring element is heat conductively disposed on a refrigerant pipe between the exit of the indoor heat-exchanger 5 and the heat accumulator 6. The electric output signals of these thermistors 9 and 50 are connected to the input terminals of the electric circuit 11", whose output terminal is connected to the input terminals of the expansion valve 4".

FIG. 12 is a sectional side view of the thermal electric expansion valve 4" of normal-open type. The valve comprises a valve part 12 which is a lower half part and a driving part 13 which is an upper half part. The valve part 12 comprises a block 14 having a valve rod 15 which is vertically movable therein in a through hole 26 and a valve seat 16 to receive said valve rod 15, and further comprises side port 17 and a bottom port 18 to which a first refrigerant pipe 19 and a second refrigerant pipe 20 are connected, respectively. The lower end tip of the valve rod 15 is tapered so as to be received in the valve seat 16. The driving part 13 has a closed space 29 defined by a casing 27 and a bottom sheet. The closed space 29 comprises a first bimetal disk 30 and a second bimetal disk 31 which are mechanically connected to each other with their peripheries held by several spacers 32, 33 of heat insulating meterial such as plastic rods. The first bimetal disk 30 is heat-insulatedly held by engagement of its center hole 34 with the end tip of a supporter 36 made of a heat insulating material mounted on the top part of the casing 27, and the second bimetal disk 31 is linked to the valve rod 15 by engagement of its center hole 35 with a protrusion 37 of the valve rod 15, which is pressed upwards by a pressure spring 39 held between a spring cover 38 and an annular recess 39'.

The first bimetal disk 30 comprises electric heater wire 40 wound on its surface and the ends of the electric heater wire 40 are connected to the terminals 41 and 42 which are provided air-tightly by means of, for example glass insulaters 41' and 42'. FIG. 12 shows the states when the heater wire 40 is not energized and therefore the valve rod 15 is apart from the valve seat 16 thereby opening the valve. When energized by the electric power fed from the terminals 41 and 42, the heater wire 40 heats the first bimetal disk 30, so that the first bimetal disk 30 becomes bent to lower the peripheral parts downwards as shown by the arrows A, A, thereby to lower the valve rod 15 downwards, overcoming the force of the spring 39. Accordingly, the gap between the lower end tip of the valve rod 15 and the valve seat 16 is narrowed and the flow rate through the valve is lowered. When the electric power fed to the heater wire 40 is larger, the flow rate of the valve is lower, and vice versa. The second bimetal disk 31 serves to compensate influence by the condition of the load and is bent by the temperature of the ambient air and refrigerant which flows into the closed space 29 through a narrow gap between the through hole 26 and the valve rod 15.

FIG. 13 is one example of electric circuit diagram of the apparatus of FIG. 11. The circuit comprises the thermistor 9 one end of which is connected to a negative terminal − of a power source. The other end of the thermistor 9 is connected to the input terminal of the proportional amplifier 54. A series connection of the thermistor 50 and a resistor 53 for setting level of superheating is connected between a positive terminal + of the power source and the input terminal of the proportional amplifier 54. The output terminal of the proportional amplifier 54 is connected to an input terminal of an output amplifier 55 comprising a buffer amplifier in its input stage. The heater wire 40 is connected to the output terminal of said output amplifier 55, so that the heater wire 40 energized by the output amplifier produces an output proportional to voltage changes of the thermistor circuit.

When a cooling load increases and hence the temperature difference between the thermistors 50 and 9 becomes higher than a predetermined value, then the resistance of the thermistor 50 decreases and the input voltage of the proportional amplifier 54 increases. Then the current of the output amplifier 55 decreases, so that the flow rate of the expansion valve 4" is increased to increase the capacity of the air conditioner thereby restoring the temperature of the thermistor 50 to a predetermined value. On the contrary, when the cooling load decreases and hence the temperature of the thermistor becomes lower, the flow rate of the expansion valve 4" is decreased, to decrease the capacity of the air conditioner thereby also restoring the temperature of the thermistor to the predetermined value.

The operation of the abovementioned apparatus is as follows:

When the power switch (not shown) is turned on to drive the compressor 1, the refrigerant flows as shown by the solid line arrows in FIG. 11, and the high pressure and high temperature refrigerant flows from the compressor 1, through the outdoor heat exchanger 3, the thermal electric expansion valve 4", the indoor heat exchanger 5 and the accumulator 6 and returns to the compressor 1. In this flow, the high temperature refrigerant is cooled by the outdoor heat exchanger 3, and pressure of the refrigerant is reduced by the expansion valve 4" thereby to lower the temperature of the refrigerant. Then, during the passing of the indoor heat exchanger 5, the temperature of the refrigerant becomes high.

When the cooling load becomes larger or smaller and therefore the temperatures difference between the thermistors 9 or 10 and 50 changes, the electric circuit 11" measures the resultant difference between a predetermined value and a difference value between the electric resistance values of the thermistors 9 and 50. And accordingly, the circuit 11" changes its output current to the heater wire 40 responding to the abovementioned resultant difference.

When the measured difference between the resistances of the thermistors 9 and 50 is smaller than a predetermined value, the circuit works to increase the output power fed to the heater wire 40 of the valve 4", thereby to bring the valve rod 15 down and hence decreases flow rate of the valve 4". Therefore, the temperature at the input end of the compressor 1 is raised, and thereby, the difference between the resistances of the thermistors 9 and 50 becomes larger.

On the contrary, when the measured difference between the resistances of the thermistor 9 and 50 is larger than the predetermined value, the circuit works to decrease the output power fed to the heater wire 40 of the valve 4", thereby to bring the valve rod 15 up and hence increases flow rate of the valve 4". Therefore, the temperature at the input end of the compressor 1 is lowered, and thereby, the difference between the resistances of the thermistors 9 and 50 becomes smaller. By means of such feed-back operation, the resistance difference between two thermistors 9 and 50 corresponding to the temperature difference between two parts, where the thermistors 9 and 50 are attached, is retained constant irrespective of variation of the cooling load, by suitably controlling condition of the refrigerant flowing into the compressor 1. Moreover, by such controlling, the temperature of the compressor 1 can be controlled by changing the flow rate of the expansion valve 4", so as not to raise it excessively high thereby to protect it.

In case of the heating operation, the automatic control operation for retaining the temperature difference for variation of the heating load is made in a similar manner by changing the flow rate of the valve 4".

Since the thermistor 9 is fixed on a midway part of the extended length of the indoor heat-exchanger 5, the thermistor 9 measures the saturation temperature of the refrigerant. The position to fix the thermistor 50 is not limited to the position near the exit of the indoor heat-exchanger 5, but also can be on a refrigerant pipe between the accumulator 6 and the compressor 1.

The elements 9 or 50 to detect the phase condition of the refrigerant are not limited to the temperature measuring devices such as thermistors, but also can be known pressure measuring devices, for example, using a piezo electric element which produces electric signals changing responding to the pressure.

As has been described in the foregoing examples, the apparatus of the present invention comprises a thermal electric type expansion valve between an evaporator and a condenser, and the apparatus has a pair of refrigerant state detecting devices to issue signals to an electric circuit for controlling the thermal electric type expansion valve, the detecting devices being disposed in a manner that a first one is at the input part of a compressor and a second one is on the evaporator at a position of gas-liquid mixed phase part which is near the part of gas single phase. By such constitution, the states of the refrigerant can be correctly detected, and accordingly the expansion valve can be controlled suitably, thereby assuring protection of the compressor.

When the abovementioned second detecting device is disposed at a central part of extended length of the evaporator, the position of the second device can be on gas-liquid mixed phase part of the refrigerant for a considerable wide change of thermal load change, and therefore, the second device can be regarded to be disposed on a position of a constant phase state. Therefore the measured result is reliable thereby enabling the apparatus properly to respond for a wide range variation of the thermal load.

When a normal-open type thermal electric expansion valve is used, a quick rise up of the operation is obtainable without use of a by-pass valve to by-pass the expansion valve at the early stage of starting.

In order to obtain correct detection and thereby a suitable operation, it is recommendable in a heating- or cooling switchable apparatus, that the disposing of the phase detecting device should be in the following positions:

in cooling operation, a detection device should be at a part of gas-liquid mixed phase and near the part of a gas single phase region of the indoor heat-exchanger, and in heating operation, a detection device should be at a part of gas-liquid mixed phase and near the part of a gas single phase region of the outdoor heat-exchanger.

A sixth example of the present invention is constituted by employing known variable capacity type compressor for the compressor 1 of the fifth example shown by FIGS. 11 to 13. The refrigerant circuit diagram, the electric circuit diagram and the sectional view of the expansion valve are identical to those of FIG. 11, FIG. 13 and FIG. 12, respectively. Since the construction is similar to the fifth example, the feature resultant from the use of the variable capacity compressor only is elucidated as follows:

The apparatus comprises a thermal electric expansion valve 4" which serves to control the apparatus for optimum operation of the cooling responding to change of capacity of the compressor of the variable capacity type. In the cooling operation, the thermistor 9 fixed on the indoor heat-exchanger 5 measures a temperature of $t_1$, and the thermistor 50 fixed on the pipe 501 measures a temperature $t_2$. Then, the temperature difference $t_2 - t_1$ is controlled to a predetermined target value $\Delta t_c$ of superheating by controlling the power fed to the heater wire 40 of the expansion valve 4" and thereby changing the flow rate of the valve 4". By means of such controlling, the flow rate of the refrigerant changes and the controlling is made so as to control the temperature difference $t_2 - t_1$ to be almost constant, irrespective of change of the compressor capacity. For the variable capacity compressor, such compressor comprising a motor of variable pole number type or another motor of variable-frequency type can be employed. Furthermore, a compressor comprising a by-pass way which is connected to its input end through a control valve can be used as the variable capacity compressor. The abovementioned control makes the apparatus always in an optimum operation irrespective of the change of the compressor capacity, and therefore gives an efficient operation, good rise up characteristic. By the use of the normal-open expansion valve, even in case of the accidental failure of the valve a fatal overload of the compressor can be eliminated. The normal-open valve also enables quick starting of the apparatus since there is no need of preliminary opening procedure of the value is not necessary. Furthermore, in case of an accidental stop of operation, a quick re-starting is possible, since the refrigerant easily spread in the whole refrigerant circuit through the open valve.

A seventh example is constituted by employing a variable capacity compressor in the third example of FIGS. 7 to 9. Accordingly, the drawings of FIGS. 7 to 9 apply. Since the construction is almost identical to the example 3, the elucidation is made only for the special feature of the operation brought by the employment of the variable capacity motor.

The apparatus comprises a thermal electric expansion valve 4' which serves to control the apparatus for optimum operation of the cooling responding to change of capacity of the compressor of the variable capacity type. In the cooling operation, the thermistor 9 fixed on the indoor heat-exchanger 5 measures temperature $t_1$, and the thermistor 10 fixed on the refrigerant pipe 7 measured a temperature $t_2$. Then, the temperature difference $t_2-t_1$ between the thermistors 9 and 10 is controlled to a predetermined target value $\Delta t_c$ of superheating by controlling the power fed to the heater wire 40 of the expansion value 4' and thereby changing the flow rate of the valve 4'. In the heating operation, the thermistor 8 fixed on the outdoor heat-exchanger 3 measures temperature $t_3$, and the thermistor 10 fixed on the pipe 7 measures a temperature $t_4$. Then the temperature difference $t_4-t_3$ between the thermistors 8 and 10 is controlled to a predetermined target value $\Delta t_h$ of superheating by controlling the power fed to the heater wire 40 of the expansion valve 4' and thereby changing the flow rate.

By means of such controlling, the flow rate of the refrigerant changes and the controlling is made so as to control the respective temperature differences $t_2-t_1$ and $t_4-t_3$ to be almost constant, irrespective of change of the compressor capacity. For the variable capacity compressor, such compressor comprising a motor of variable pole number type or another motor of variable-frequency type motor can be employed. Furthermore, a compressor comprising a by-pass way which is connected to its input end through a control valve can be used as the variable capacity compressor. The above-mentioned control makes the apparatus always in an optinum operation irrespective of the change of the compressor capacity, and therefore gives an efficient operation, good rise up characteristic. Accordingly efficient heating and cooling can be made, according to the present invention apparatus. Furthermore, by means of the flow rate controlling by the expansion valve 4', refrigerant returning to the compressor 1 can be controlled not to be excessively much, thereby prolonging the life of the apparatus. By use of the normal-open expansion valve, even in case of the accidental failure of the valve a fatal overload of the compressor can be eliminated. The normal open valve also enables quick starting of the apparatus since there is no need of preliminary opening procedure of the valve is not necessary. Furthermore, in case of an accidental stop of operation, a quick re-starting is possible, since the refrigerant easily spread in the whole refrigerant circuit through the open valve. Moreover, by adopting the two directional expansion valve 4', the mechanism of the apparatus becomes simple.

What is claimed is:

1. An air conditioner comprising:
    a compressor for compressing a refrigerant,
    an outdoor heat-exchanger,
    a thermal electric type expansion valve serving as a pressure reducing device for controlling flow rate of said refrigerant,
    an indoor heat-exchanger,
    refrigerant pipes connecting said compressor, said outdoor heat-exchanger, said device and said indoor heat-exchanger in series,
    characterized in that
    said valve comprises a valve part and a driving part,
    said valve part comprises a valve seat disposed in a fluid path between a pair of ports, a valve rod which is movable in relation to said valve seat thereby to change flow rate of the valve,
    said driving part comprises, in a casing, a pair of bimetal pieces which are linked each other by a heat insulating spacer to said casing, one of said bimetal pieces supporting said valve rod and the other of said bimetal pieces being held by said casing in a heat insulated manner, said first bimetal piece having a heater wire disposed in heat conductive relation thereto to move said rod responding to an input of electric power to said wire, and
    said air conditioner further comprises an electric power output means which issues said input electric power, value of which changes responding to a refrigerant state difference between a first refrigerant state measured by a first measurement element disposed on either one of said indoor heat-exchanger or said outdoor heat-exchanger that is functioning as an evaporator at a position of extended length thereof where the refrigerant always is in a mixed phase of gas and liquid and a second refrigerant state measured by a second measurement element disposed at a part between said either one of said indoor heat-exchanger or said outdoor heat-exchanger functioning as an evaporator and said compressor.

2. An air conditioner in accordance with claim 1, wherein said position is at a central part of said extended length.

3. An air conditioner in accordance with claim 1, wherein said measurement elements are thermistors which give electric signals responding to the measured temperature to said electric power output means.

4. An air conditioner in accordance with claim 1, wherein said measurement element is a pressure measurement element which produces electric signal responding to the pressure of the refrigerant.

5. An air conditioner in accordance with claim 1, wherein said measurement elements are thermistors and said electric power output means produces said electric input power ,f a value responding to a difference of resistances of the thermistors from a predetermined resistance difference.

6. An air conditioner comprising:
    a compressor for compressing a refrigerant,
    an outdoor heat-exchanger,
    a thermal electric type expansion valve serving as a pressure reducing device for controlling flow rate of said refrigerant,
    an indoor heat-exchanger,
    refrigerant pipes connecting said compressor, said outdoor heat-exchanger, said device and said indoor heat-exchanger in series,
    characterized in that:
    said valve comprises a valve part and a driving part,
    said valve part comprises a valve seat disposed in a fluid path between a pair of ports, a valve rod which is movable in relation to said valve seat thereby to change flow rate of the valve,
    said driving part comprises, in a casing, a pair of bimetal pieces which are linked each other by a heat insulating spacer to said casing, one of said bimetal pieces supporting said valve rod and the other of said bimetal pieces being held by said casing in a heat insulated manner, said first bimetal piece having a heater wire disposed in heat conductive relation thereto to move said rod responding to an input of electric power to said wire,
    said air conditioner further comprises an electric power output means which issues said input electric power, value of which changes responding to a refrigerant state difference between a first refrigerant state measured by a first measurement element disposed on either one of said indoor heat-exchanger or said outdoor heat-exchanger that is functioning as an evaporator at a central position of extended length thereof where the refrigerant always is in a mixed phase of gas and liquid and a second refrigerant state measured by a second measurement element disposed at a part between said either one of said indoor heat-exchanger or said outdoor heat-exchanger functioning as an evaporator and said compressor, said first and said second measurement elements are thermistors which give electric signals responding to the measured temperature to said electric power output means, and said electric power output means produces said electric input power of a value responding to a difference of resistances of said thermistors from a predetermined resistance difference.

7. An air conditioner in accordance with claim 1 or 6, wherein said thermal electric type expansion valve fully opens when said input electric power from said electric power output means is cut off, and gradually closes as said input electric power increases.

8. An air conditioner in accordance with claim 1 or 6, wherein said thermal electric type expansion valve is closed when said input electric power from said electric power output means is cut off, and gradually opens as said input electric power increases.

9. An air conditioner comprising:
a compressor for compressing a refrigerant,
an outdoor heat-exchanger,
a pressure reducing device which controls flow rate of said refrigerant,
an indoor heat-exchanger,
refrigerant pipes connecting said compressor, said outdoor heat-exchanger, said valve and said indoor heat-exchanger in series,
characterized in that
said pressure reducing device is a thermal electric bilateral direction type expansion valve comprising a bimetal piece held in a heat insulated manner and to move its moving part responding to an input electric power to a heater to heat said bimetal piece thereby to change flow rate of said valve and
said air conditioner further comprises
refrigerant state measurement elements disposed respectively on said outdoor heat-exchanger and said indoor heat-exchanger and another refrigerant state measurement element disposed at the refrigerant input end of said compressor and
an electric power output means which issues said input electric power, value of which changes responding to a refrigerant state difference between a first refrigerant state measured by said refrigerant state measurement element disposed on either one of said indoor heat-exchanger or said outdoor heat-exchanger that is functioning as an evaporator and a second refrigerant state measured by said another refrigerant state measurement element.

10. An air conditioner in accordance with claim 9, wherein said measurement element disposed on either one of said indoor heat-exchanger or said outdoor heat-exchanger is disposed at a position of extended length of said heat-exchanger where the refrigerant constitutes a mixed phase of gas and liquid.

11. An air conditioner in accordance with claim 10, wherein said position is at a central part of said extended length.

12. An air conditioner in accordance with claim 9, wherein said measurement elements are thermistors which give electric signals responding to the measured temperature to said electric power output means.

13. An air conditioner in accordance with claim 9, wherein said measurement elements are a pressure measurement elements which produce electric signal responding to the pressure of the refrigerant.

14. An air conditioner in accordance with claim 9, wherein said measurement elements are thermistors and said electric power output means produces said electric input power of a value responding to a difference of resistances of the thermistors from a predetermined resistance difference.

15. An air conditioner in accordance with claim 9, wherein said thermal electric type expansion valve fully opens when said input electric power from said electric power output means is cut off, and gradually closes as said input electric power increases.

16. An air conditioner in accordance with claim 9, wherein said thermal electric type expansion valve is closed when said input electric power from said electric power output means is cut off, and gradually opens as said input electric power increases.

17. An air conditioner in accordance with claim 9, wherein said another measurement element is disposed on a refrigerant pipe between a four-way valve which switches direction of the refrigerant flow and an input end of said compressor.

18. An air conditioner in accordance with claim 9, wherein a first measurement element for cooling operation and a second measurement element for heating operation are provided as said another measurement element, in a manner that said first measurement element is disposed on a refrigerant pipe between said indoor heat-exchanger and a four-way valve which switches direction of the refrigerant flow and said second measurement element is disposed on a refrigerant pipe between said outdoor heat-exchanger and said four-way valve.

19. An air conditioner in accordance with claim 9, wherein said thermal electric type expansion valve comprises a valve part and a driving part,
said valve part comprises a valve seat disposed in a fluid path between a pair of ports, a valve rod which is movable in relation to said valve seat thereby to change flow rate of the valve,
said driving part comprises, in a casing, a pair of bimetal pieces which are linked each other by a heat insulating spacer to said casing, one of said bimetal pieces supporting said valve rod and the other of said bimetal pieces being held by said casing in a heat insulated manner, said first bimetal piece having a heater wire disposed in heat conductive relation thereto.

20. An air conditioner comprising:
a compressor for compressing a refrigerant,
an outdoor heat-exchanger,
a pressure reducing device which controls flow rate of said refrigerant,
an indoor heat-exchanger,
refrigerant pipes connecting said compressor, said outdoor heat-exchanger, said valve and said indoor heat-exchanger in series,
characterized in that
said compressor is a variable capacity type compressor, said pressure reducing device is a thermal electric type expansion valve comprising a valve part and a driving part to drive said valve part, a bimetal piece held in said driving part in a heat insulated manner and to move its moving part responding to an input electric power to a heater to heat said bimetal piece thereby to change flow rate of said valve, said moving part driving said valve part and said air conditioner further comprises a refrigerant circuit switching valve for reversing the direction of refrigerant with respect to said heat-exchangers, refrigerant state measurement elements disposed respectively on said outdoor heat-exchanger and said indoor heat-exchanger and another refrigerant state measurement element disposed on a refrigerant pipe between either of said heat-exchanger and the refrigerant input end of said compressor and an electric power output means which issues said input electric power, value of which changes responding to a refrigerant state difference between a first refrigerant state measured by said refrigerant state measurement element disposed on either one of heat-exchanger that is functioning as an evaporator and a second refrigerant state measured by said another refrigerant state measurement element.

21. An air conditioner in accordance with claim 20, wherein said measurement element disposed on either one of said indoor heat-exchanger or said outdoor heat-exchanger is disposed at a position of extended length of said heat-exchanger where the refrigerant constitutes a mixed phase of gas and liquid.

22. An air conditioner in accordance with claim 21, wherein said position is at a central part of said extended length.

23. An air conditioner in accordance with claim 20, wherein said measurement elements are thermistors which give electric signals responding to the measured temperature to said electric power output means.

24. An air conditioner in accordance with claim 20, wherein said measurement element is a pressure measurement element which produces electric signal responding to the pressure of the refrigerant.

25. An air conditioner in accordance with claim 20, wherein said measurement elements are thermistors and said electric power output means produces said electric input power of a value responding to a difference of resistances of the thermistors from a predetermined resistance difference.

26. An air conditioner in accordance with claim 20, wherein said thermal electric type expansion valve fully opens when said input electric power from said electric power output means is cut off, and gradually closes as said input electric power increases.

27. An air conditioner in accordance with claim 20, wherein said thermal electric type expansion valve is closed when said input electric power from said electric power output means is cut off, and gradually opens as said input electric power increases.

28. An air conditioner comprising:
a compressor for compressing a refrigerant,
an outdoor heat-exchanger,
a pressure reducing device which controls flow rate of said refrigerant,
an indoor heat-exchanger,
refrigerant pipes connecting said compressor, said outdoor heat-exchanger, said valve and said indoor heat-exchanger in series, characterized in that said compressor is a variable capacity compressor, said pressure reducing device is a thermal electric bilateral direction type expansion valve comprising a bilateral valve part and a driving part to drive said bilateral valve part, a bimetal piece held in said driving part in a heat insulated manner and to move its moving part responding to an input electric power to a heater to heat said bimetal piece thereby to change flow rate of said valve, said moving part driving said valve part and said air conditioner further comprises a refrigerant circuit switching valve for reversing the direction of refrigerant with respect to said heat-exchangers, refrigerant state measurement elements disposed respectively on said outdoor heat-exchanger and said indoor heat-exchanger and another refrigerant state measurement element disposed at the refrigerant input end of said variable capacity compressor and an electric power output means which issues said input electric power, value of which changes responding to a refrigerant state difference between a first refrigerant state measured by said refrigerant state measurement element disposed on either one of said indoor heat-exchanger or said outdoor heat-exchanger that is functioning as an evaporator and a second refrigerant state measured by said another refrigerant state measurement element.

29. An air conditioner in accordance with claim 28, wherein said measurement element disposed on either one of said indoor heat-exchanger or said outdoor heat-exchanger is disposed at a position of extended length of said heat-exchanger where the refrigerant constitutes a mixed phase of gas and liquid.

30. An air conditioner in accordance with claim 29, wherein said position is at a central part of said extended length.

31. An air conditioner in accordance with claim 28, wherein said measurement elements are thermistors which give electric signals responding to the measured temperature to said electric power output means.

32. An air conditioner in accordance with claim 28, wherein said measurement element is a pressure measurement element which produces electric signal responding to the pressure of the refrigerant.

33. An air conditioner in accordance with claim 28, wherein said measurement elements are thermistors and said electric power output means produces said electric input power of a value responding to a difference of resistances of the thermistors from a predetermined resistance difference.

34. An air conditioner in accordance with claim 28, wherein said thermal electric type expansion valve fully opens when said input electric power from said electric power output means is cut off, and gradually closes as said input electric power increases.

35. An air conditioner in accordance with claim 28, wherein said thermal electric type expansion valve is closed when said input electric power from said electric power output means is cut off, and gradually opens as said input electric power increases.

36. An air conditioner in accordance with claim 28, wherein said another measurement element is disposed on a refrigerant pipe between a four-way valve which switches direction of the refrigerant flow and an input end of said compressor.

37. An air conditioner in accordance with claim 28, wherein a first measurement element for cooling operation and a second measurement element for heating operation are provided as said another measurement element, in a manner that said first measurement element is disposed on a refrigerant pipe between said indoor heat-exchanger and a four-way valve which switches direction of the refrigerant flow and said second measurement element is disposed on a refrigerant pipe between said outdoor heat-exchanger and said four-way valve.

38. An air conditioner comprising:
a compressor for compressing a refrigerant,
an outdoor heat-exchanger,
a pressure reducing device which controls flow rate of said refrigerant,
an indoor heat-exchanger,
refrigerant pipes connecting said compressor, said outdoor heat-exchanger, said valve and said indoor heat-exchanger in series,
characterized in that
said compressor is a variable capacity type compressor,
said pressure reducing device is a thermal electric bilateral direction type expansion valve comprising a valve part and a driving part to drive said valve part, a bimetal piece held in said driving part in a heat insulated manner and to move its moving part responding to an input electric power to a heater to heat said bimetal piece thereby to change flow rate of said valve, said moving part driving said valve part and
said air conditioner further comprises
a refrigerant circuit switching valve for reversing the direction of refrigerant with respect to said heat-exchangers,
refrigerant state measurement elements disposed respectively on said outdoor heat-exchanger and said indoor heat-exchanger and another refrigerant state measurement element disposed at the refrigerant input end of said variable capacity type compressor and
an electric power output means which issues said input electric power, value of which changes responding to a refrigerant state difference between a first refrigerant state measured by said refrigerant state measurement element disposed on either one of said indoor heat-exchanger or said outdoor heat-exchanger that is functioning as an evaporator and a second refrigerant state measured by said another refrigerant state measurement element.

* * * * *